United States Patent
Neidorff

(10) Patent No.: US 7,504,895 B2
(45) Date of Patent: Mar. 17, 2009

(54) MULTI-PHASE INTERLEAVED OSCILLATOR

(75) Inventor: Robert Alan Neidorff, Bedford, NH (US)

(73) Assignee: Texas Instruments Incorporated, Dallas, TX (US)

( * ) Notice: Subject to any disclaimer, the term of this patent is extended or adjusted under 35 U.S.C. 154(b) by 112 days.

(21) Appl. No.: 11/786,059

(22) Filed: Apr. 10, 2007

(65) Prior Publication Data

US 2008/0252391 A1 Oct. 16, 2008

(51) Int. Cl.
*H03L 7/24* (2006.01)
(52) U.S. Cl. .......................................... 331/55; 331/46
(58) Field of Classification Search .................. 331/45, 331/46, 50, 55
See application file for complete search history.

(56) References Cited

U.S. PATENT DOCUMENTS

| 3,679,984 | A * | 7/1972 | Buus | 330/2 |
| 6,204,694 | B1 * | 3/2001 | Sunter et al. | 326/93 |
| 7,236,059 | B2 * | 6/2007 | Stevenson et al. | 331/46 |
| 2003/0131272 | A1 * | 7/2003 | Watts et al. | 713/322 |
| 2004/0032300 | A1 | 2/2004 | Joordens et al. | |
| 2007/0063589 | A1 * | 3/2007 | Koegel et al. | 307/43 |

FOREIGN PATENT DOCUMENTS

| JP | 54079549 A | 6/1979 |
| WO | 2007063965 A1 | 6/2007 |

* cited by examiner

*Primary Examiner*—Don P Le
(74) *Attorney, Agent, or Firm*—Warren J. Franz; Frederick J. Telecky, Jr.; Wade J. Brady, III

(57) ABSTRACT

An oscillator for synchronizing and controlling a multi-phase, interleaved power supply system that has a plurality of power sources. The oscillator includes a first oscillator, having a pulse generator and a timing capacitor, and a second oscillator, having a pulse generator and timing capacitor, that are electrically coupled to one or more first power supplies and one or more second power supplies, respectively. The pulse generator of the first oscillator is electrically coupled to the second timing capacitor and the pulse generator of the second oscillator is electrically coupled to the first timing capacitor. Each of the pulse generators is structured and arranged to provide a synchronizing pulse to the other oscillator's timing capacitor when the voltage on its own timing capacitor is midway between a pre-determined maximum voltage threshold and a pre-determined minimum voltage threshold.

22 Claims, 3 Drawing Sheets

MULTI-PHASE INTERLEAVED OSCILLATOR

CROSS REFERENCE TO RELATED APPLICATIONS (Not applicable)

STATEMENT REGARDING FEDERALLY SPONSORED RESEARCH OR DEVELOPMENT (Not applicable)

BACKGROUND OF THE INVENTION

The present invention relates to a versatile integrated circuit (IC) device that can be used for controlling multi-phase, e.g., four-phase, interleaved power supplies and to systems and methods using the same. Use of a single, large power supply to power, for example, a personal computer (PC), which, periodically, needs a significant amount of current, can result in significant current surges. As a result of the surges, the electronic components of the PC must be designed to be more rugged and robust to handle the high-current in-rush surges.

Interleaving of power supplies, in which two or more power supplies are operated out-of-phase, is commonly employed in, for example, PC power supplies. Time-shifting the multiple power supplies causes the interleaved power supply system to provide voltage peaks at half the magnitude but at twice the frequency. Correspondingly, inter alia, there is less noise, less radio frequency interference, less electromagnetic interference, and less stress from in-rush currents. Moreover, less robust and less expensive electronic devices can be used.

Conventionally, when multiple power supplies are interleaved, a master oscillator is employed to coordinate the pulse width modulation (PWM) of the IC devices. Thus, it would be desirable to provide an IC device that can be used for multi-phase, e.g., four-phase, applications and, moreover, that can eliminate the master oscillator.

BRIEF SUMMARY OF THE INVENTION

An oscillator for synchronizing and controlling a multi-phase, interleaved power supply system that has a plurality of power supplies is disclosed. The oscillator includes a first oscillator and a second oscillator that each have a pulse generator. The first oscillator is electrically coupled to one or more first power supplies and to a first timing capacitor. The second oscillator is electrically coupled to one or more second power supplies and to a second timing capacitor.

The pulse generator of the first oscillator is electrically coupled to the second timing capacitor and the pulse generator of the second oscillator is electrically coupled to the first timing capacitor. Each of the pulse generators is structured and arranged to monitor the voltage on its associated timing capacitor and to provide a synchronizing pulse to the other oscillator's timing capacitor when the voltage on its own timing capacitor is midway between a pre-determined maximum voltage threshold and a pre-determined minimum voltage threshold.

Also disclosed is a multi-phase, interleaved power supply system and a method of synchronizing and controlling a multi-phase, interleaved power supply system using the oscillator.

BRIEF DESCRIPTION OF THE SEVERAL VIEWS OF THE DRAWINGS

The foregoing and other objects, features, and advantages of the invention will be apparent from the following more particular description of preferred embodiments of the invention, as illustrated in the accompanying drawings in which like reference characters refer to the same parts throughout the different views.

DETAILED DESCRIPTION OF THE INVENTION

Figure 1:
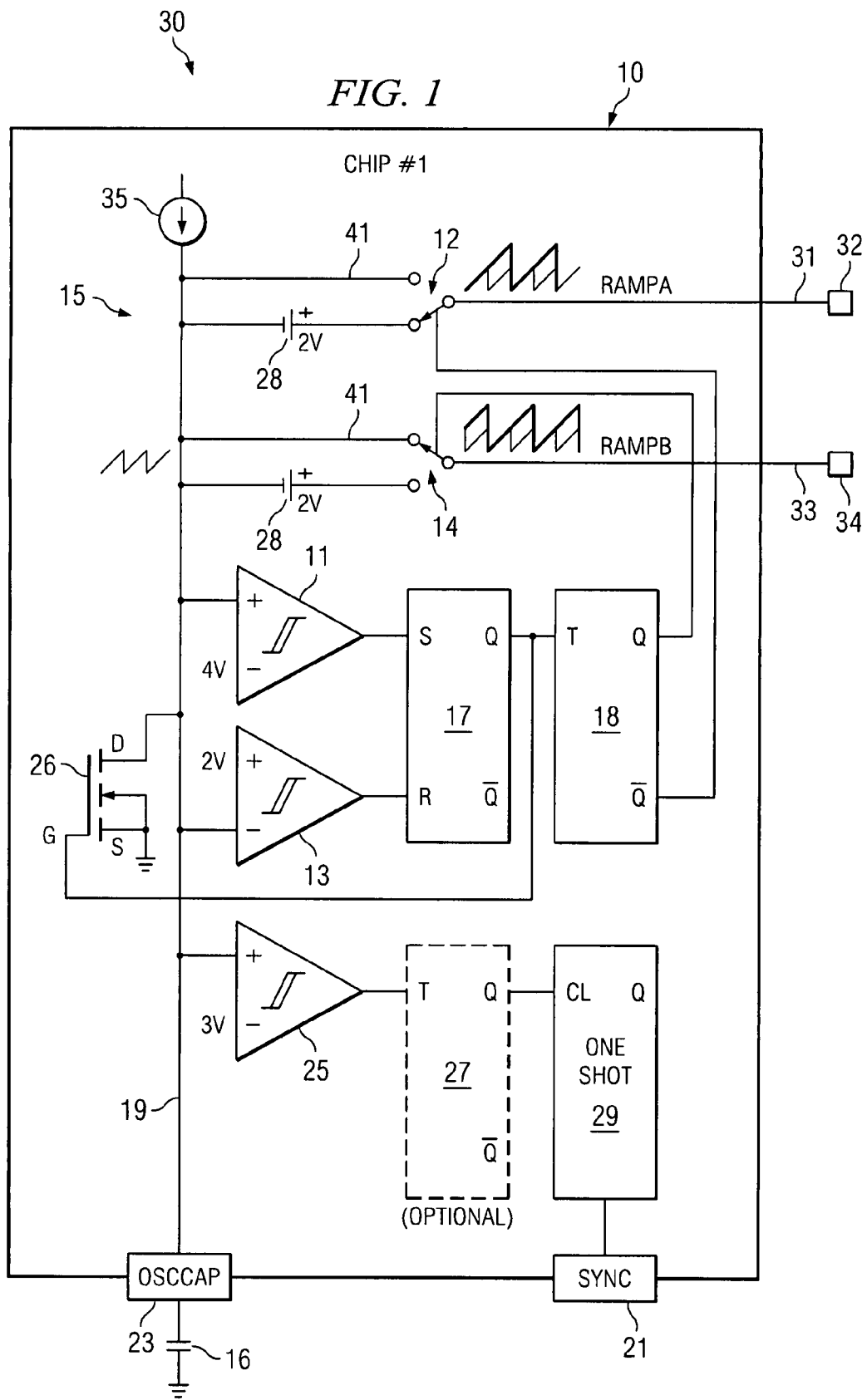
FIG. 1 shows a schematic of an oscillator in accordance with the present invention.

Referring to FIG. 1, an oscillator 10 for use in an multi-phase, interleaved power supply system 30 will be described. The oscillator 10, which, typically, can be implemented as an integrated circuit (IC) device, provides time-shifted ramp switching signals to each of the self-contained, switching power supplies 32 and 34 and, more particularly, provides time-shifted, ramp switching signals that are 360°/N out-of-phase (where the variable N corresponds to the total number of power supplies in the multi-phase, interleaved power supply system). The ramp switching signals control the switching of power devices contained in power supplies 32 and 34 through pulse width modulation (PWM) as is well known to the art.

The oscillator 10 includes output pins 31 and 33, a synchronization output (SYNC) pin 21, and an oscillation capacitor (OSCCAP) pin 23. Output pins 31 and 33 are electrically coupled to power supplies 32 and 34, respectively. In the two-phase implementation shown, the SYNC pin 21 is floating and the low side of the timing capacitor 16 is grounded.

The high side of the timing capacitor 16 is electrically coupled to a current source 35 via an OSCCAP bus or line 19. The capacitance value of the timing capacitor 16 can be selected to provide a desired frequency. The drain D of a switching device 26 is electrically coupled to the OSCCAP line 19, for the purpose of discharging the timing capacitor 16, e.g., to ground via its source S. Those skilled in the art can appreciate that the polarity of the switching device 26 can be reversed so that the source S of the switching device 26 is electrically coupled to the OSCCAP line 19 and the drain D is electrically coupled to ground. The switching device 26 and the timing capacitor 16 are structured and arranged to provide a linear, saw-tooth voltage ramp signal between a pre-determined, maximum voltage threshold, e.g., about 4 Volts (4V), and a pre-determined minimum voltage threshold, e.g., about 2 Volts (2V).

The switching device 26 shown in FIG. 1 is an n-type MOSFET switching device. Those of ordinary skill in the art can appreciate that other field effect transistors (FETs), bi-polar junction transistors (BJTs), and the like can be used for switching operations in accordance with the scope or spirit of this invention.

The oscillator 10 includes oscillator circuitry 15 for transmitting linear, saw-tooth, time-shifted, PWM switching signals (RAMP A and RAMP B) to control the switching of power supplies 32 and 34. The oscillator circuitry 15 is adapted to operate at 2F, where the variable F is the frequency of any desired phase. The oscillator circuitry 15 includes a plurality of comparators 11, 13, and 25 and a plurality of logic sequential devices or latches, such as flip-flops 17 and 18.

The inputs of comparators 11 and 13 are electrically coupled to the OSCCAP line 19, and the outputs of comparators 11 and 13 are electrically coupled, respectively, to the SET (S) and RESET (R) pins of an R/S-type flip-flop 17. Further, comparators 11 and 13 are adapted to measure the voltage on the OSCCAP line 19 and to set or re-set the R/S-type flip-flop 17 depending on whether the voltage on the OSCCAP line 19 is at its pre-determined maximum voltage threshold (4V) or at its pre-determined minimum voltage threshold (2V).

The first (2V) comparator 13 is adapted to output a voltage high signal when the voltage on the line equals its pre-determined minimum voltage threshold. The second (4V) comparator 11 is adapted to output a voltage high signal when the voltage on the line equals its pre-determined maximum voltage threshold. Thus, when the voltage on the OSCCAP line 19 reaches its pre-determined maximum voltage threshold, the second comparator 11 sets the R/S-type flip-flop 17, outputting a voltage high signal to a toggle-type flip flop 18 and to the switching device 26. When the voltage on the OSCCAP line 19 reaches its pre-determined minimum voltage threshold, the first comparator 13 resets the R/S-type flip-flop 17, causing the S/R-type flip flop 17 to output a voltage low signal.

When the R/S-type flip-flop 17 is SET, a voltage high signal is output, tripping a toggle-type flip-flop 18 and energizing the gate G of the switching device 26. When the gate G of the switching device 26 is energized, the charge stored in the timing capacitor 16 and the voltage on the OSCCAP line 19 discharge to ground. Once the voltage on the OSCCAP line 19 reaches the pre-determined minimum voltage threshold, the first comparator 13 detects the voltage level and outputs a voltage high signal, resetting the R/S-type flip-flop 17.

When R/S-type flip-flop 17 is RESET, the gate G of the switching device 26 is de-energized, discharging to ground ceases, and charge is stored in the timing capacitor 16 until the pre-determined, maximum voltage threshold is again reached and the process begins anew.

When the toggle-type flip flop 18 is tripped, switching signals are transmitted simultaneously or substantially simultaneously from the Q output and the Q output of the flip-flop 18. The outputs are transmitted to switches 12 and 14, which are electrically coupled to output pins 31 and 33 and to power supplies 32 and 34, respectively.

Switches 12 and 14 are structured and arranged to switch between the OSCCAP line 19 and a DC power source 28, e.g., a 2V DC battery, which is electrically coupled to the OSCCAP line 19. Moreover, the switches 12 and 14 are adapted so that when one of the switches is electrically coupled to the OSCCAP line 19, e.g., RAMP B in FIG. 1, the other switch is electrically coupled to the DC power source 28, e.g., RAMP A in FIG. 1. Although two DC power sources 28 are shown in FIG. 1, those skilled in the art can appreciate that switches 12 and 14 can share a single DC power source 28 and, moreover, that there are other means and methods of providing alternating ramp signals.

When switch 12 is electrically coupled to the DC power source 28, a saw-tooth, ramp switching signal RAMP A (ranging in magnitude between about 4V and about 6V) is transmitted to control the switching of power supply 32. For example, output pin 31 can be electrically coupled to a comparator (not shown) that is integrated into or with the power supply 32. Output from the comparator turns ON and OFF the power switch (not shown) of the power supply 32, which regulates output from the power supply 32.

More specifically, for voltage-mode control, the comparator compares the incoming ramp switching signal RAMP A with the voltage output of an error amplifier (not shown). The error amplifier is adapted to monitor the present power system output and sets a threshold based on the error between the desired power system output and the monitored power system output. Thus, when the ramp switching signal RAMP A is above the error amplifier output voltage, the power switch is OFF. When the ramp switching signal RAMP A is below the error amplifier output voltage, the power switch is ON. Accordingly, if the power system 30 is not delivering sufficient power, the error amplifier output increases, causing the power switch to remain ON longer.

When switch 12 is electrically coupled to the DC power source 28, switch 14 is electrically coupled to the OSCCAP line 19. When switch 14 is electrically coupled to the OSCCAP line 19, a saw-tooth, ramp switching signal RAMP B (ranging in magnitude between about 2V and about 4V) is transmitted to control the switching of power supply 34. For example, output pin 33 can be electrically coupled to a comparator (not shown) that is integrated into or with the power supply 34. Output from the comparator turns ON and OFF the power switch (not shown) of the power supply 34, which regulates output from the power supply 34.

More specifically, for voltage-mode control, the comparator compares the incoming ramp switching signal RAMP B with the output of an error amplifier (not shown). The error amplifier is adapted to monitor the present power system output and sets a threshold based on the error between the desired power system output and the monitored power system output. Thus, when the ramp switching signal RAMP B is above the error amplifier output voltage, the power switch is OFF. When the ramp switching signal RAMP B is below the error amplifier output voltage, the power switch is ON. Accordingly, if the power system 30 is not delivering sufficient power, the error amplifier output increases, causing the power switch to remain ON longer.

Power supply 32 continues to provide power to the load based on a RAMP A switching signal and power supply 34 continues to provide power to the load based on a RAMP B switching signal until the voltage on the OSCCAP line 19 again reaches the pre-determined maximum voltage threshold, at which point the R/S-type flip flop 17 is set and toggle-type flip flop 18 outputs switching signals to switches 12 and 14, electrically coupling switch 14 to the DC power source 28 and electrically coupling switch 12 to OSCCAP line 19. With this arrangement, the RAMP A switching signal is now applied to power supply 34 and the RAMP B switching signal is now applied to power supply 32.

In short, during operation of the two-phase implementation 30, ramp switching signals RAMP A and RAMP B provide linear, saw-tooth ramp switching signals ranging in magnitude between about 2V and about 6V. Power supplies 32 and 34 provide power to the load as a result of output from comparators integrated in or with the power supplies 32 and 34. Moreover, due to the switching action, the ramp switching signals RAMP A and RAMP B are out-of-phase by about 180 degrees. Although the invention has been described using voltage-mode control, those skilled in the art can appreciate that other control modes are possible.

Figure 2A:
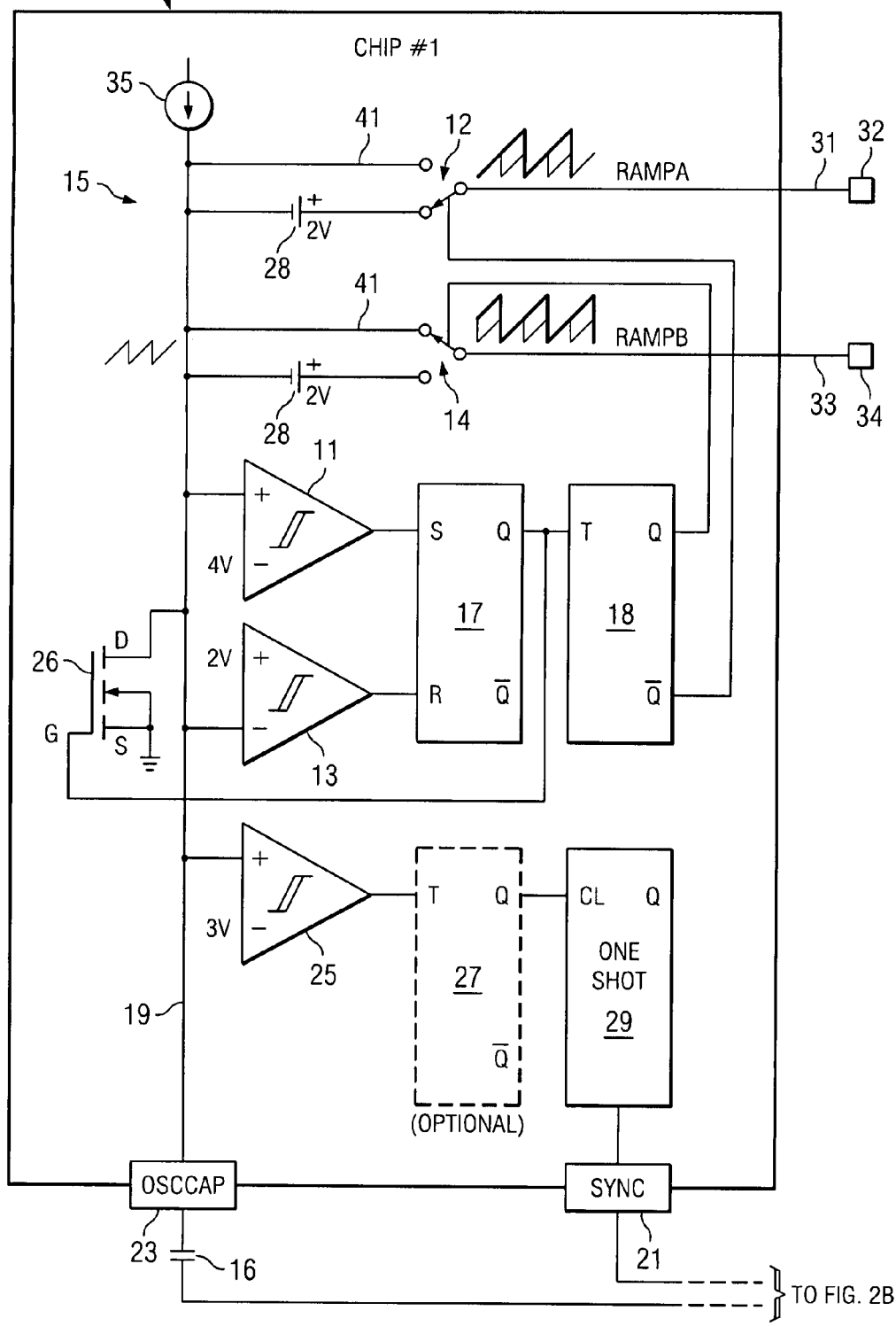
FIG. 2 shows a schematic of a four-phase, interleaved power supply system in accordance with the present invention.
Figure 2B:
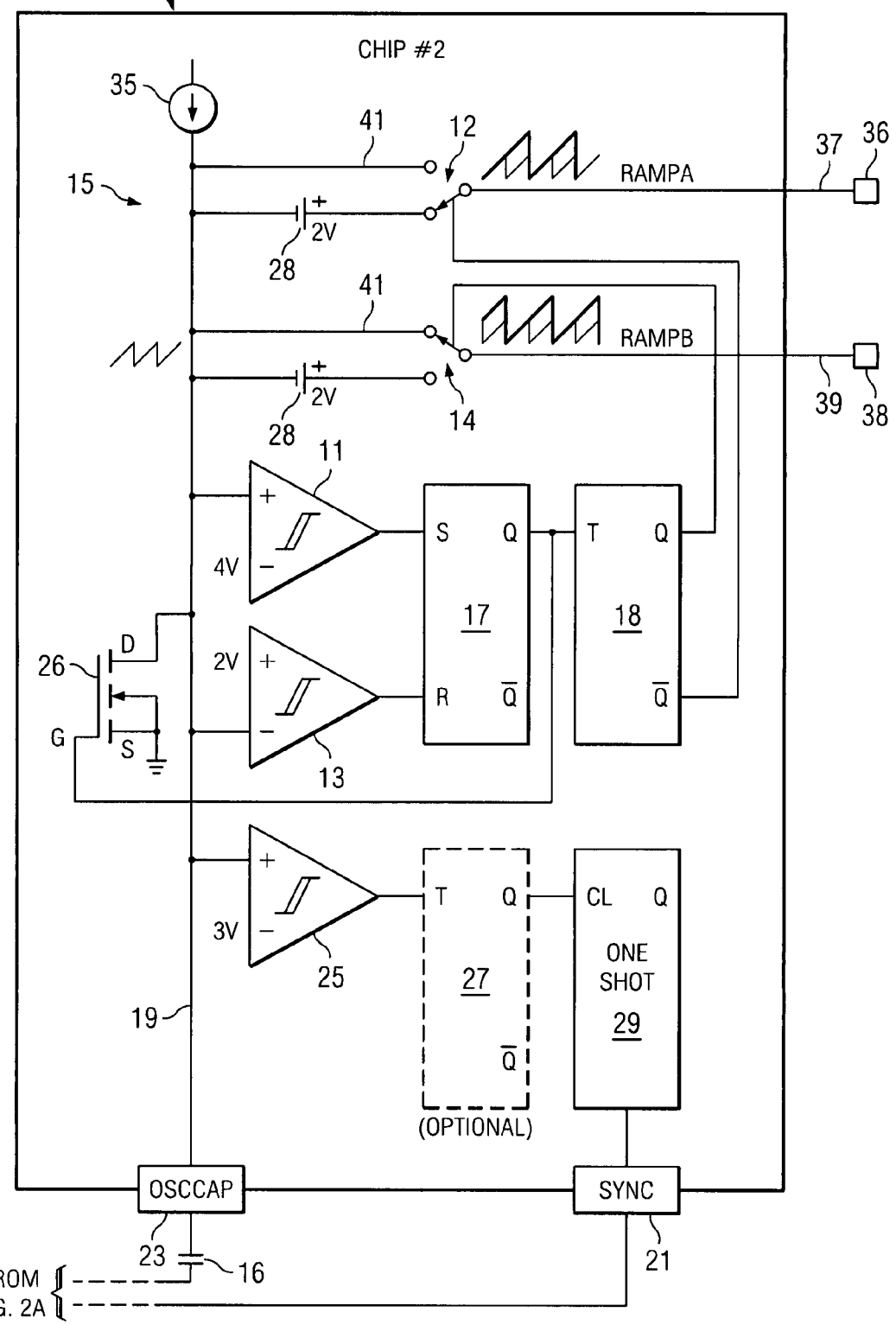

Having described an oscillator for time-shifting a two-phase power supply system, application of plural such oscillators for providing a multi-phase, interleaved power supply system will be described. Referring to FIG. 2, a multi-phase, interleaved power supply system 20 is shown. For illustrative purposes only, the multi-phase, interleaved power supply system 20 in FIG. 2, is a four-phase system. Those of ordinary skill in the art can appreciate the applicability of the current invention to higher-phase systems. For convenience, however, the invention will be described for a four-phase, interleaved power supply system 20 (hereinafter the four-phase implementation).

The four-phase implementation 20 includes a first oscillator 22 that is electrically coupled to a second oscillator 24. Each of the first and second oscillators 22 and 24 corresponds to the two-phase implementation previously described with reference to FIG. 1.

For a four-phase implementation 20, the output pins 31 and 33 of the first oscillator 22 are electrically coupled to one or more power supplies 32 and 34, respectively, and output pins 37 and 39 of the second oscillator 24 are electrically coupled to one or more power supplies 36 and 38, respectively. Each of the first and second oscillators 22 and 24 includes a synchronization output (SYNC) pin 21 and an oscillation capacitor (OSCCAP) pin 23, which are adapted to synchronize the four power supplies 32, 34, 36, and 38 to be 90 degrees out-of-phase. The SYNC pin 21 of the first oscillator 22 is electrically coupled via the timing capacitor 16 to the OSC-CAP pin 23 of the second oscillator 24 and the SYNC pin 21 of the second oscillator 24 is electrically coupled via the timing capacitor 16 to the OSCCAP pin 23 of the first oscillator 22.

Each of the oscillators 22 and 24 of the four-phase implementation further includes a half-scale comparator 25 and a pulse generator ("one-shot") device 29. The input of the half-scale comparator 25 is electrically coupled to the OSCCAP line 19, to monitor the voltage. The output of the half-scale comparator 25 is electrically coupled to the input of the pulse generator 29. More particularly, the half-scale comparator 25 is structured and arranged to output a voltage high signal when the voltage on the OSCCAP line 19 is about half-way between the pre-determined maximum and minimum voltage thresholds, e.g., 3 Volts (3V). Accordingly, during operation, when the voltage on the OSCCAP line 19 equals 3V during ramp-up, the half-scale comparator 25 outputs a voltage high signal to the one-shot device 29.

The saw-tooth ramp signal of the timing capacitor 16 is linear, consequently, the half-way point between the pre-determined, maximum and minimum voltage thresholds corresponds to the half-way point between the frequencies as well. Hence, the power supplies 32, 34, 36, and 38 are capable of being synchronized 90 degrees out-of-phase without a master oscillator. The half-scale comparator 25, however, may include a small amount of offset. Hence the oscillator circuitry 15 may synchronize to between 85 degrees and 95 degrees out-of-phase rather than to exactly 90 degrees out-of-phase. Such a minor phase deviation, however, will not significantly impact performance of the four-phase implementation 20.

When the one-shot device 29 receives the voltage high signal from the half-scale comparator 25, the one-shot device 29 is adapted to output a brief, synchronizing pulse, e.g., a 2 Volt (2V) pulse. The brief, synchronizing pulse is transmitted to the low side of the timing capacitor 16 of the other oscillator, stepping up the voltage on the OSC CAP line 19 above the second oscillator's pre-determined, maximum voltage threshold.

Once the voltage on the OSC CAP line 19 of the second oscillator 24 exceeds its pre-determined maximum voltage threshold, as previously described in connection with the two-phase implementation, the second (4V) comparator 11 sets the S/R-type flip-flop 17, tripping a toggle flip-flop 18 and activating the gate G of the switching device 26, causing the charge stored in the timing capacitor 16 and the voltage on the OSC CAP line 19 to discharge to ground until the voltage level reaches about 2V. Moreover, the toggle flip-flop 18 of the second oscillator 24 outputs synchronizing switching signals to the switches 12 and 14 of the second oscillator 24 so that each of the power supplies 32, 34, 36, and 38 is energized 90 degrees out-of-phase. Whichever oscillator 22 or 24 is faster will synchronize the slower device or, alternatively, if the oscillators 22 and 24 are equally fast, they will alternately synchronize each other midway between the linear ramp-up.

Optionally, as shown in FIG. 2, a toggle flip-flop 27 can be added between the half-scale comparator 25 and the one-shot device 29, to synchronize the four-phase implementation 20. With this addition, synchronization occurs once every 360 degrees rather than once every 180 degrees. Alternatively, a frequency divider having a plurality of flip-flops (not shown) can be used for synchronizing the four-phase implementation 20. As a result, synchronization occurs once per 720 degrees or, if desired, in any multiple of 360 degrees rather than once per 180 degrees.

While the invention is described through the above-described exemplary embodiments, it will be understood by those of ordinary skill in the art that modifications to, and variations of, the illustrated embodiments may be made without departing from the inventive concepts disclosed herein. Accordingly, the invention should not be viewed as limited, except by the scope and spirit of the appended claims.

What is claimed is:

1. An oscillator for synchronizing and controlling a multi-phase, interleaved power supply system having a plurality of power supplies providing power to a load, each of the plurality of power supplies being energized out-of-phase with every other power supply of the plurality of power supplies, the oscillator comprising:

a first oscillator, having a pulse generator and electrically coupled to a first timing capacitor, that provides synchronizing, out-of-phase switching signals to one or more first power supplies; and a second oscillator, having a pulse generator and electrically coupled to a second timing capacitor, that provides synchronizing, out-of-phase switching signals to one or more second power supplies;

wherein each of the pulse generators is structured and arranged to transmit a synchronizing pulse of a magnitude sufficient to exceed a pre-determined maximum voltage threshold of the other oscillator.

2. The oscillator as recited in claim 1, wherein the first oscillator includes:

a first device that monitors voltage on a line electrically coupled to the first timing capacitor and that influences one of the one or more first power supplies;

a second device that monitors voltage on the line electrically coupled to the first timing capacitor and that influences another of the one or more first power supplies; and a third device that monitors voltage on the line electrically coupled to the first timing capacitor and that is adapted to provide a synchronizing pulse to the second timing capacitor.

3. The oscillator as recited in claim 2, wherein:

the first device influences one of the one or more first power supplies when the voltage on the line equals the pre-determined maximum voltage threshold;

the second device influences another of the one or more first power supplies when the voltage on the line equals a pre-determined minimum voltage threshold; and the third device provides the synchronizing pulse to the second timing capacitor when the voltage on the line has a magnitude midway between the pre-determined maximum voltage threshold and the pre-determined minimum voltage threshold.

4. The oscillator device as recited in claim 3, wherein the first oscillator further comprises a switching device that discharges voltage on the line when said voltage equals the pre-determined maximum voltage threshold.

5. The oscillator as recited in claim 1, wherein the second oscillator includes:

a first device that monitors voltage on a line electrically coupled to the second timing capacitor and that influences one of the one or more second power supplies;

a second device that monitors voltage on the line electrically coupled to the second timing capacitor and that influences another of the one or more second power supplies; and a third device that monitors voltage on the line electrically coupled to the second timing capacitor and that is adapted to provide a synchronizing pulse to the first timing capacitor.

6. The oscillator as recited in claim 5, wherein:

the first device influences one of the one or more second power supplies when the voltage on the line equals the pre-determined maximum voltage threshold;

the second device influences another of the one or more second power supplies when the voltage on the line equals a pre-determined minimum voltage threshold; and the third device provides the synchronizing pulse to the first timing capacitor when the voltage on the line has a magnitude midway between the pre-determined maximum voltage threshold and the pre-determined minimum voltage threshold.

7. The oscillator device as recited in claim 6, wherein the second oscillator further comprises a switching device that discharges voltage on the line when said voltage equals the pre-determined maximum voltage threshold.

8. The oscillator as recited in claim 1, wherein the second timing capacitor is electrically coupled to the pulse generator of the first oscillator and the first timing capacitor is electrically coupled to the pulse generator of the second oscillator.

9. The oscillator as recited in claim 1 further comprising at least one additional oscillator, each of the at least one additional oscillator having a pulse generator and electrically coupled to an associated timing capacitor, that provides synchronizing, out-of-phase switching signals to each of an associated plurality of power supplies.

10. The oscillator as recited in claim 9, wherein the first oscillator includes:

a first device that monitors voltage on a line electrically coupled to the first timing capacitor and that influences one of the one or more first power supplies;

a second device that monitors voltage on the line electrically coupled to the first timing capacitor and that influences another of the one or more first power supplies; and a third device that monitors voltage on the line electrically coupled to the first timing capacitor and that is adapted to provide a synchronizing pulse to at least one of the second timing capacitor and the associated timing capacitor of one of the at least one additional oscillator.

11. The oscillator as recited in claim 10, wherein:

the first device influences one of the one or more first power supplies when the voltage on the line equals the pre-determined maximum voltage threshold;

the second device influences another of the one or more first power supplies when the voltage on the line equals a pre-determined minimum voltage threshold; and the third device provides the synchronizing pulse when the voltage on the line has a magnitude midway between the pre-determined maximum voltage threshold and the pre-determined minimum voltage threshold.

12. The oscillator as recited in claim 9, wherein the second oscillator includes:

a first device that monitors voltage on a line electrically coupled to the second timing capacitor and that influences one of the one or more second power supplies;

a second device that monitors voltage on the line electrically coupled to the second timing capacitor and that influences another of the one or more second power supplies; and a third device that monitors voltage on the line electrically coupled to the second timing capacitor and that is adapted to provide a synchronizing pulse to at least one of the first timing capacitor and the associated timing capacitor of one of the at least one additional oscillator.

13. The oscillator as recited in claim 12, wherein:

the first device influences one of the one or more second power supplies when the voltage on the line equals the pre-determined maximum voltage threshold;

the second device influences another of the one or more second power supplies when the voltage on the line equals a pre-determined minimum voltage threshold; and the third device provides the synchronizing pulse when the voltage on the line has a magnitude midway between the pre-determined maximum voltage threshold and the pre-determined minimum voltage threshold.

14. The oscillator as recited in claim 9, wherein each of the at least one additional oscillator includes:

a first device that monitors voltage on a line electrically coupled to its associated timing capacitor and that influences one of the one or more associated power supplies;

a second device that monitors voltage on the line electrically coupled to its associated timing capacitor and that influences another of the one or more associated power supplies; and a third device that monitors voltage on the line electrically coupled to its associated timing capacitor and that is adapted to provide a synchronizing pulse to at least one of the first timing capacitor and the second timing capacitor.

15. The oscillator as recited in claim 14, wherein:

the first device influences one of the one or more associated power supplies when the voltage on the line equals the pre-determined maximum voltage threshold;

the second device influences another of the one or more associated power supplies when the voltage on the line equals a pre-determined minimum voltage threshold; and the third device provides the synchronizing pulse when the voltage on the line has a magnitude midway between the pre-determined maximum voltage threshold and the pre-determined minimum voltage threshold.

16. The oscillator as recited in claim 9, wherein each of the at least one additional oscillator further comprises a switching device that discharges voltage on the line when said voltage equals the pre-determined maximum voltage threshold.

17. A multi-phase, interleaved power supply system for providing power to a load, the power supply system comprising:
one or more first power supplies;
one or more second power supplies,
each power supply of the one or more first and of the one or more second power supplies providing power out-of-phase with every other power supply of the one or more first and the one or more second power supplies; and
an oscillation device for synchronizing and controlling power delivery to the load by the one or more first and the one or more second power supplies by pulse width modulation, the oscillation device having:
a first oscillator, having a pulse generator and electrically coupled to a first timing capacitor, that provides synchronizing, out-of-phase switching signals to each of the one or more first power supplies; and
a second oscillator, having a pulse generator and electrically coupled to a second timing capacitor, that provides synchronizing, out-of-phase switching signals to each of the one or more second power supplies,
wherein each of the pulse generators is structured and arranged to transmit a synchronizing pulse, causing the other oscillator to transmit said out-of-phase switching signals.

18. The multi-phase, interleaved power supply system as recited in claim 17, wherein each of the pulse generators is structured and arranged to transmit a synchronizing pulse of a magnitude sufficient to exceed a pre-determined maximum voltage threshold of the other oscillator.

19. The multi-phase, interleaved power supply system as recited in claim 17, wherein the second timing capacitor is electrically coupled to the pulse generator of the first oscillator and the first timing capacitor is electrically coupled to the pulse generator of the second oscillator.

20. The multi-phase, interleaved power supply system as recited in claim 17, further comprising:
one or more third power supplies, each power supply of the one or more third power supplies providing power out-of-phase of every other power supply of the one or more first, second, and third power supplies; and
at least one additional oscillator, each of the at least one additional oscillators having an associated pulse generator and electrically coupled to an associated timing capacitor, each of the at least one additional oscillator adapted to provide synchronizing, out-of-phase switching signals to each of one or more power supplies associated therewith.

21. A method of synchronizing and controlling a multi-phase, interleaved power supply system having a plurality of power supplies providing power to a load, each of the plurality of power supplies providing power out-of-phase with every other power supply of the plurality of power supplies, the method comprising:
electrically coupling a first oscillator having a pulse generator to a first timing capacitor and to one or more first power supplies;
electrically coupling a second oscillator having a pulse generator to a second timing capacitor and to one or more second power supplies;
electrically coupling the pulse generator of the first oscillator to the second timing capacitor;
electrically coupling the pulse generator of the second oscillator to the first timing capacitor;
measuring voltages associated with the first and the second timing capacitor; and
outputting a synchronizing pulse from at least one of the pulse generator of the first oscillator to the second timing capacitor or the pulse generator of the second oscillator to first timing capacitor when the magnitude of the measured voltage is at a threshold between a pre-determined maximum voltage threshold on the first timing capacitor and a pre-determined minimum voltage threshold on the second timing capacitor.

22. The method as recited in claim 21, wherein outputting the synchronizing pulse from the pulse generator of the first oscillator to the second timing capacitor or from the pulse generator of the second oscillator to first timing capacitor includes outputting a synchronizing pulse of sufficient magnitude so that, when combined, respectively, with the voltage associated with the second timing capacitor or the first timing capacitor, the pre-determined maximum voltage threshold is equaled or exceeded.

* * * * *